US010869543B2

(12) United States Patent
Chang

(10) Patent No.: US 10,869,543 B2
(45) Date of Patent: Dec. 22, 2020

(54) PET GROOMING TOOL

(71) Applicant: Eversharp-PRO Company, Taichung (TW)

(72) Inventor: Shao-Peng Chang, Taichung (TW)

(73) Assignee: EVERSHARP-PRO COMPANY, Taichung (TW)

( * ) Notice: Subject to any disclaimer, the term of this patent is extended or adjusted under 35 U.S.C. 154(b) by 218 days.

(21) Appl. No.: 16/182,150

(22) Filed: Nov. 6, 2018

(65) Prior Publication Data

US 2020/0008571 A1    Jan. 9, 2020

(30) Foreign Application Priority Data

Jul. 5, 2018    (TW) .............................. 107209081 U

(51) Int. Cl.
| | | |
|---|---|---|
| A46B 15/00 | (2006.01) | |
| A01K 13/00 | (2006.01) | |
| A46B 17/06 | (2006.01) | |
| A46B 9/02 | (2006.01) | |

(52) U.S. Cl.
CPC .......... *A46B 15/0055* (2013.01); *A01K 13/00* (2013.01); *A46B 9/028* (2013.01); *A46B 17/06* (2013.01); *A46B 2200/1093* (2013.01)

(58) Field of Classification Search
CPC .... A01K 13/00; A01K 13/002; A01K 13/001; A01K 17/00; A01K 11/00; A01K 13/003; A01K 13/006; A01K 15/025; A01K 15/026; A46B 9/028; A46B 15/0055; A46B 17/06; A46B 2200/1093; A46B 13/001; A46B 15/0071; A46B 15/0073; A46B 2200/1066; A46B 2200/30; A61K 31/195; A61K 31/198; A61K 47/02; A61K 47/12; A61K 47/183; A61K 47/34; A61K 9/0004; A61K 9/0053; A61K 9/0097; A61K 9/06; A61K 9/10; A61K 9/14
See application file for complete search history.

(56) References Cited

U.S. PATENT DOCUMENTS

| | | | | |
|---|---|---|---|---|
| 5,276,932 | A * | 1/1994 | Byrd ...................... | A46B 13/08 15/22.1 |
| 2014/0026821 | A1* | 1/2014 | Tu ......................... | A01K 13/002 119/600 |
| 2014/0261226 | A1* | 9/2014 | Fung .................... | A01K 13/002 119/625 |

\* cited by examiner

*Primary Examiner* — Timothy D Collins
*Assistant Examiner* — Brittany A Lowery
(74) *Attorney, Agent, or Firm* — Muncy, Geissler, Olds & Lowe, P.C.

(57) ABSTRACT

A pet grooming tool includes a handle, a comb member, a push button, a gear rack, and a removal assembly. The removal assembly is rotatably connected to the handle and is movable between an original position and a removal position. The comb member has multiple claws, each has a distal end. A first slit is defined between every two adjacent claws. The removal assembly has a pinion section and multiple removing sections. The pinion section engages with the gear rack. The removing sections are corresponding to the first slits, respectively. when the removal assembly revolves from the original position to the removal position, the multiple removing sections pass through the first slits towards the distal ends of the multiple claws, so as to remove any hair from the claws.

3 Claims, 4 Drawing Sheets

PET GROOMING TOOL

FIELD OF THE INVENTION

The present invention relates to a pet grooming tool which is capable of removing pet's loosen hair smoothly and efficiently.

BACKGROUND OF THE INVENTION

A conventional pet grooming tool is used to comb and remove pet's hair, and it is essential to clean the grooming tool so as to remove the pet's hair. And thus there is a need to develop a grooming tool that can remove the hair from the grooming tool smoothly and efficiently.

SUMMARY OF THE INVENTION

The primary aspect of the present invention is to provide a pet grooming tool which is capable of removing pet's hair from the grooming tool smoothly and efficiently.

To achieve the above aspect, a pet grooming tool provided by the present invention includes a handle, a comb member, a push button, a gear rack, and a removal assembly. The handle includes a grip section, an extension, and two connection portions. The extension is defined between the grip section and the two connection portions, and the extension has a first accommodation chamber and an orifice communicating with the first accommodation chamber. The comb member is fixed between the two connection portions, and the comb member includes arcuate claws. A first slit is defined between every two adjacent of the arcuate claws, and each of the arcuate claws has a distal end. The push button is slidably housed in the orifice. The gear rack are accommodated in the first accommodation chamber and linearly moveable with the push button. The removal assembly is rotatably connected with the handle and moveable between an original position and a removal position. The removal assembly includes a pinion section and multiple removing sections The pinion section engages with the gear rack. The removing sections are corresponding to the first slits of the arcuate claws, respectively. When the removal assembly revolves from the original position to the removal position, the removing sections pass through the first slits towards the distal ends of the arcuate claws. Any loosen hair strand twined on the claws can thus be removed easily and efficiently.

Preferably, the pet grooming tool further includes a coupling element connected between the gear rack and the push button.

Preferably, the pet grooming tool further includes a resilient element configured to retract the removal assembly towards the original position.

DETAILED DESCRIPTION OF THE PREFERRED EMBODIMENTS

Figure 1A:
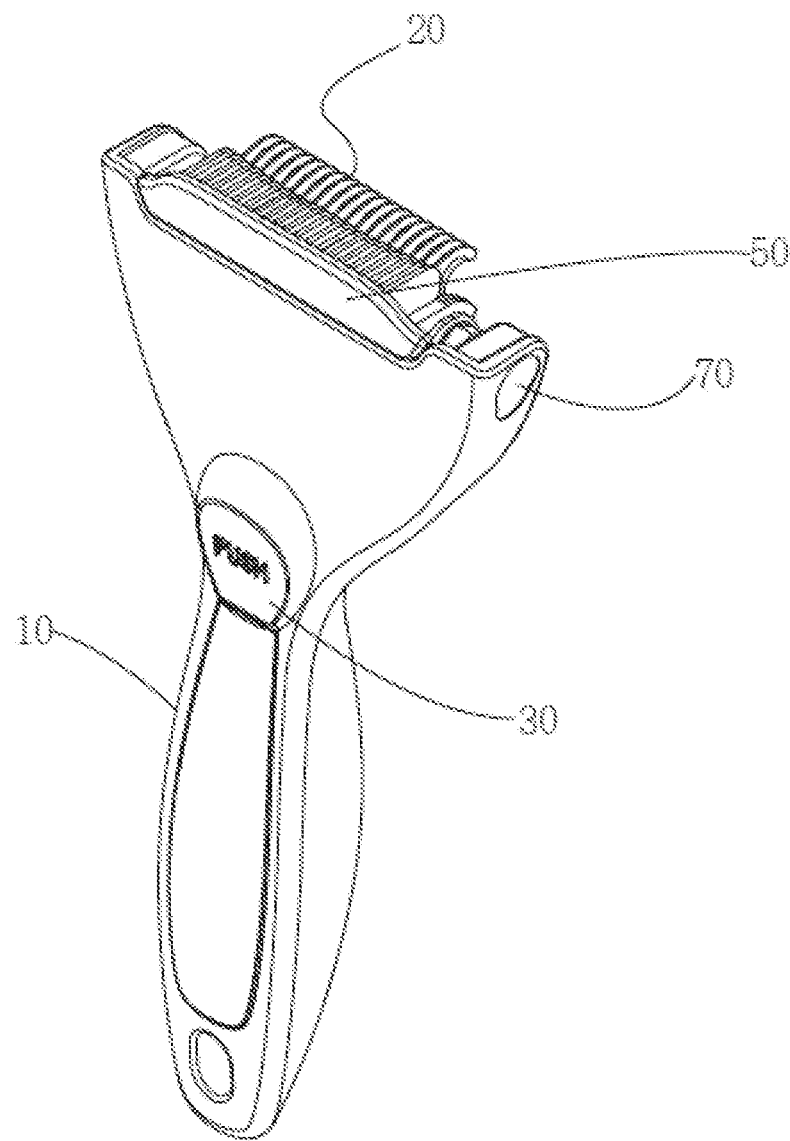
FIG. 1A is a perspective view showing a pet grooming tool according to an embodiment of the present invention.
Figure 1B:
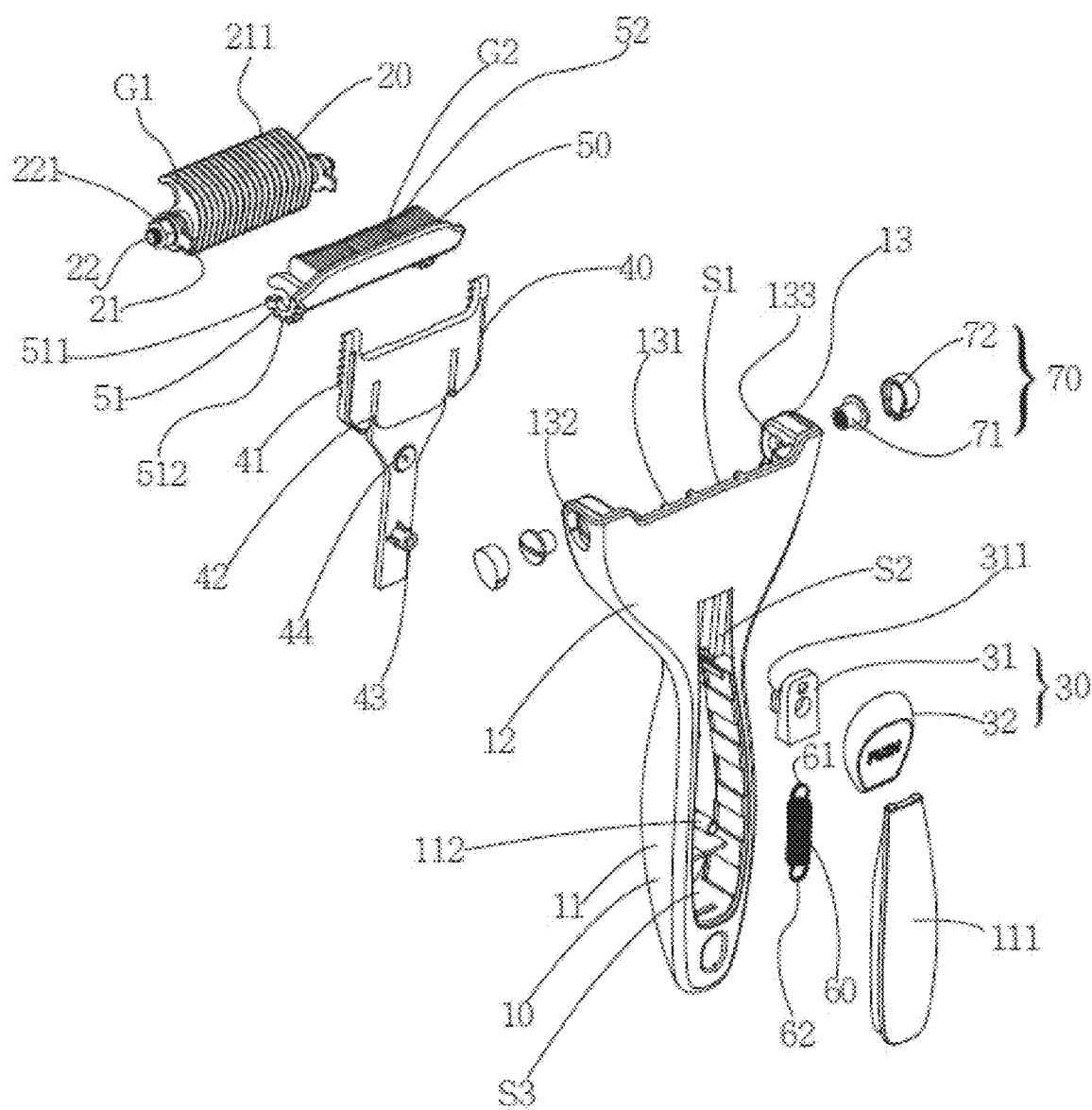
FIG. 1B is an explosive drawing showing the pet grooming tool according to the embodiment of the present invention.

With reference to FIGS. 1A and 1B, a pet grooming tool according to an embodiment of the present invention comprises: a handle 10, a comb member 20, a push button 30, an actuation member 40, a removal assembly 50, a resilient element 60, and two fixing members 70.

The handle 10 includes a grip section 11, an extension 12, and two connection portions 13. The grip 11 is configured to be held by user. The extension 12 is defined among the grip section 11 and the two connection portions 13 and has a first accommodation chamber 51 defined in the extension 12, and the extension 12 also has an orifice S2 communicating with the first accommodation chamber 51. The grip section 11 further has a second accommodation chamber S3 communicating with the first accommodation chamber 51, wherein the first accommodation chamber S1 and the second accommodation chamber S3 are configured to accommodate the actuation member 40. Each of the two connection portions 13 has a limitation rib 131 arranged in the first accommodation chamber S1, a notch 132 defined on an outer wall of each connection portion 13, and an aperture 133 passing through a bottom of the notch 132. The grip section 11 further has a cover 111 configured to cover the second accommodation chamber S3 and has a first column 112 extending from a bottom of the second accommodation chamber S3.

The comb member 20 includes arcuate claws 21 and a shaft 22. The shaft 22 is inserted through and connected with the arcuate claws 21 by ways of two screwing portions 221, wherein a first slit G1 is defined between every two adjacent of the arcuate claws 21, and each of the arcuate claws 21 has a distal end 211 configured to contact with pet's skin or hair.

The push button 30 includes a coupling element 31 and a driving lid 32 fixed on the coupling element 31, and the coupling element 31 has a first joining portion 311, wherein the push button 30 is slidably housed in the orifice S2.

The actuation member 40 includes a gear rack 41 arranged on two sides of a first surface of a first end thereof respectively, two slots 42 defined on a second surface of the first end of the actuation member 40, a second column 43 extending from a surface of a second end of the actuation member 40 the same as the second surface of the first end of the actuation member 40, and a second joining portion 44 defined among the two slots 42 and the second column 43 and corresponding to the first joining portion 311.

The removal assembly 50 includes two fitting segments 51 and multiple removing sections 52 arranged between the two fitting segment 51. Each of the two fitting segments 51 has an opening 511 and a pinion section 512 partially surrounding the opening 511, wherein a second slit G2 is defined between every two adjacent of the multiple removing sections 52.

The resilient element 60 can be a spring such as a coil spring or a torsion spring, and the resilient element 60 includes a first connecting segment 61 and a second connecting segment 62.

Each of the two fixing members 70 includes a locking part 71 and a cap 72 corresponding to the notch 132.

Figure 2A:
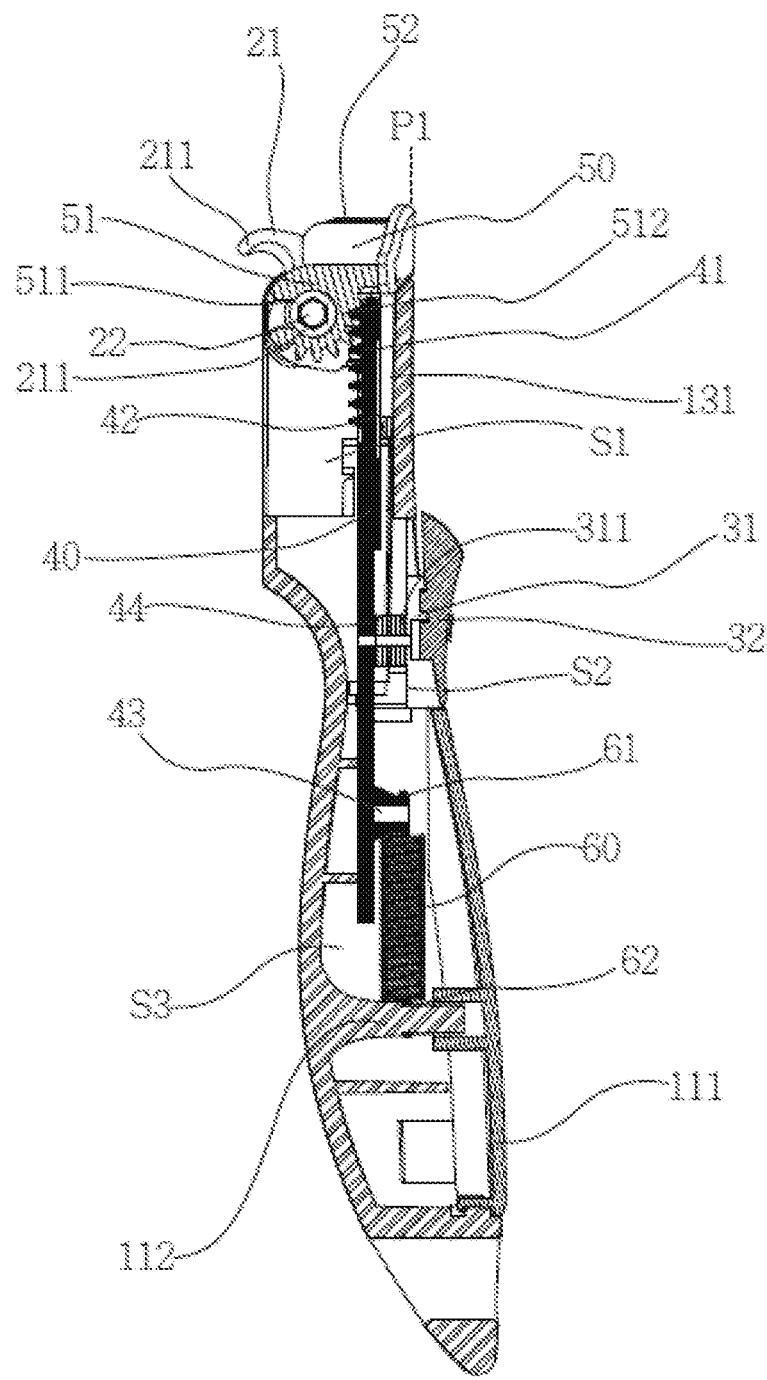
FIG. 2A is a cross sectional view showing the pet grooming tool according to the embodiment of the present invention.

Referring to FIGS. 1B and 2A, in assembly, the actuation member 40 is housed in the first accommodation chamber 51 and the second accommodation chamber S3, the first connecting segment 61 and the second connecting segment 62 of the resilient element 60 are connected with the second column 43 of the actuation member 40 and the first column 112 of the second accommodation chamber S3 respectively, and the second accommodation chamber S3 is covered by the cover 111. Thereafter, the push button 30 is slidably housed in the orifice S2, the first joining portion 311 is coupled with the second joining portion 44 of the actuation member 40 so that the push button 30 is moved to drive the actuation member 40 and the gear rack 41 to move linearly. On the other hand, the limitation rib 131 of the first accommodation chamber S1 abuts against the two slots 42 of the actuation member 40 so that the actuation member 40 moves stably.

Thereafter, the removal assembly 50 is fitted on the shaft 22 among the arcuate claws 21 and the two screwing portions 221 by using the two fitting segments 51 so that the removal assembly 50 rotates along the shaft 22, second slits G2 of the removal assembly 50 correspond to the arcuate claws 21 of the comb member 20 individually, and first slits G1 of the arcuate claws 21 correspond to the multiple removing sections 52 of the removal assembly 50 respectively so that the removal assembly 50 partially stacks with and located beside the comb member 20. Two ends of the shaft 22 are inserted into two apertures 33 of the two connection portions 13 so that the comb member 20 and the removal assembly 50 are fixed between the two connection portions 13, and the pinion section 512 of the removal assembly 50 meshes with the gear rack 41 of the actuation member 40. The two locking parts 71 lock a part of the shaft 22 extending out of the bottom of the notch 132, and the cap 72 is placed into the notch 132 so as to cover the two locking parts 71, thus avoiding the two locking parts 71 contacting with an external environment. As show in FIG. 2A, the resilient element 60 pushes the actuation member 40 to move toward the grip section 11 so that the removal assembly 50 is fixed at an original position P1.

Figure 2B:
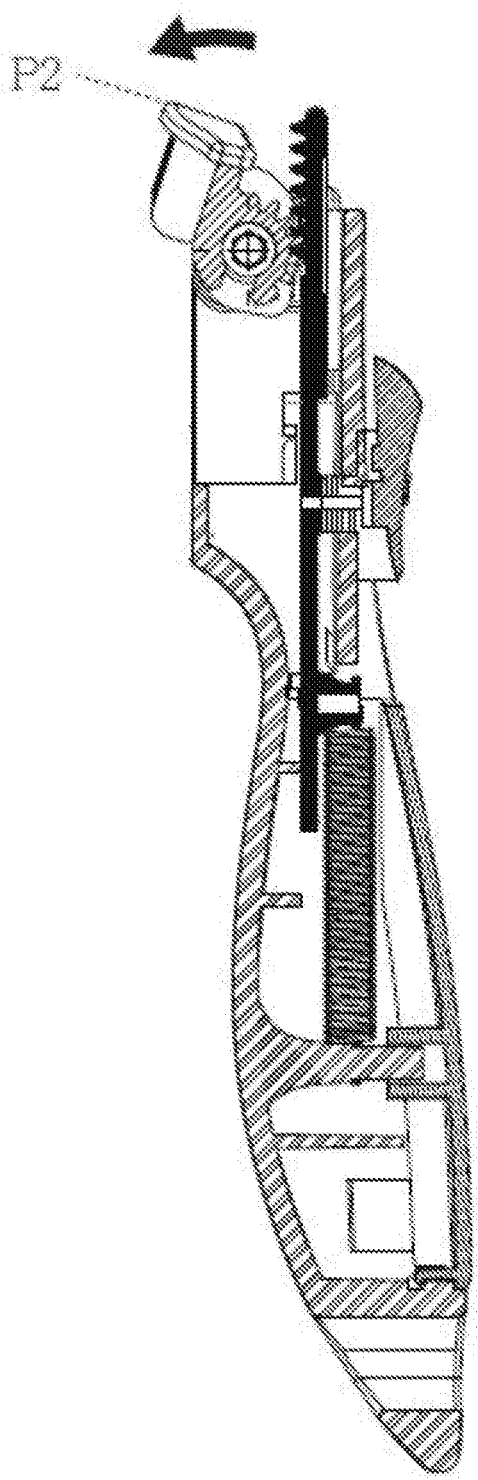
FIG. 2B is a cross sectional view showing the operation of the pet grooming tool according to the embodiment of the present invention.

As illustrated in FIG. 2B, after the comb member 20 removes the pet's hair, the user can push the push button 30 towards the two connection portions 13. In the meantime, the gear rack 41 of the actuation member 40 actuates the pinion section 512 of the removal assembly 50 to revolve counterclockwise so that the multiple removing sections 52 of the removal assembly 50 pass through the first slits G1 among the arcuate claws 21 of the comb member 20 individually and move to a removal position P2 via distal ends 211 of the arcuate claws 21. When the multiple removing sections 52 of the removal assembly 50 pass through the first slits G1 among the arcuate claws 21, the pet's hair are removed from the arcuate claws 21. When the user releases the push button 30, the resilient element 60 retracts the actuation member 40 towards the grip section 11, and the gear rack 41 drives the pinion section 512 to revolve clockwise, such that the removal assembly 50 moves back to the original position P1. Thereby, the pet's hair are removed easily and smoothly.

In another embodiment, the resilient element 60 is in connection with the coupling element 31 of the push button 30 so as to drive the actuation member 40.

While the preferred embodiments of the invention have been set forth for the purpose of disclosure, modifications of the disclosed embodiments of the invention as well as another embodiment thereof may occur to those skilled in the art. The scope of the claims should not be limited by the preferred embodiments set forth in the examples, but should be given the broadest interpretation consistent with the description as a whole.

What is claimed is:

1. A pet grooming tool comprising:
a handle including a grip section, an extension, and two connection portions, the extension being defined between the grip section and the two connection portions, the extension having a first accommodation chamber and an orifice communicating with the first accommodation chamber;
a comb member fixed between the two connection portions, and the comb member including multiple claws, wherein a first slit is defined between every two adjacent of the claws, and each of the claws has a distal end;
a push button slidably housed in the orifice;
a gear rack accommodated in the first accommodation chamber and linearly movable along with the push button; and
a removal assembly rotatably connected with the handle and movable between an original position and a removal position, the removal assembly including a pinion section and multiple removing sections, wherein the pinion section engages with the gear rack, the multiple removing sections are corresponding to the first slits of the multiple claws, respectively, wherein when the removal assembly revolves from the original position to the removal position, the multiple removing sections pass through the first slits towards the distal ends of the multiple claws.

2. The pet grooming tool as claimed in claim 1, further comprises a coupling element connected between the gear rack and the push button.

3. The pet grooming tool as claimed in claim 1, further comprising a resilient element configured to retract the removal assembly towards the original position.

\* \* \* \* \*